Nov. 20, 1945.   P. S. ODWARD   2,389,384
HOLDER FOR FISHING POLES
Filed June 21, 1944   2 Sheets-Sheet 1
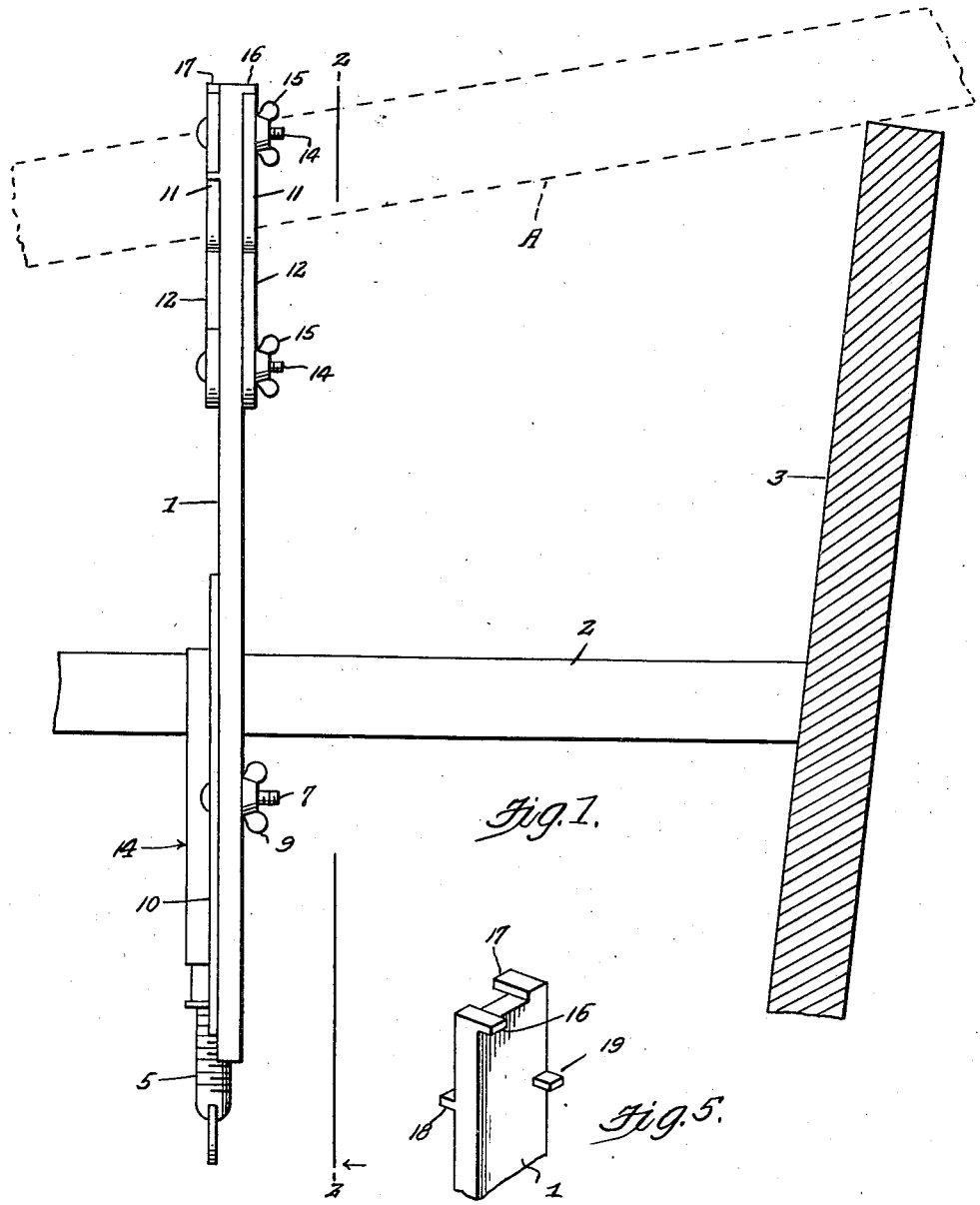
Inventor
Paul S. Odward.
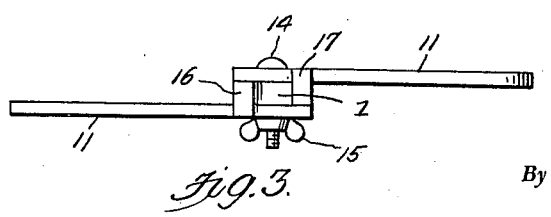
Attorneys Nov. 20, 1945.　　　P. S. ODWARD　　　2,389,384
HOLDER FOR FISHING POLES
Filed June 21, 1944　　　2 Sheets-Sheet 2
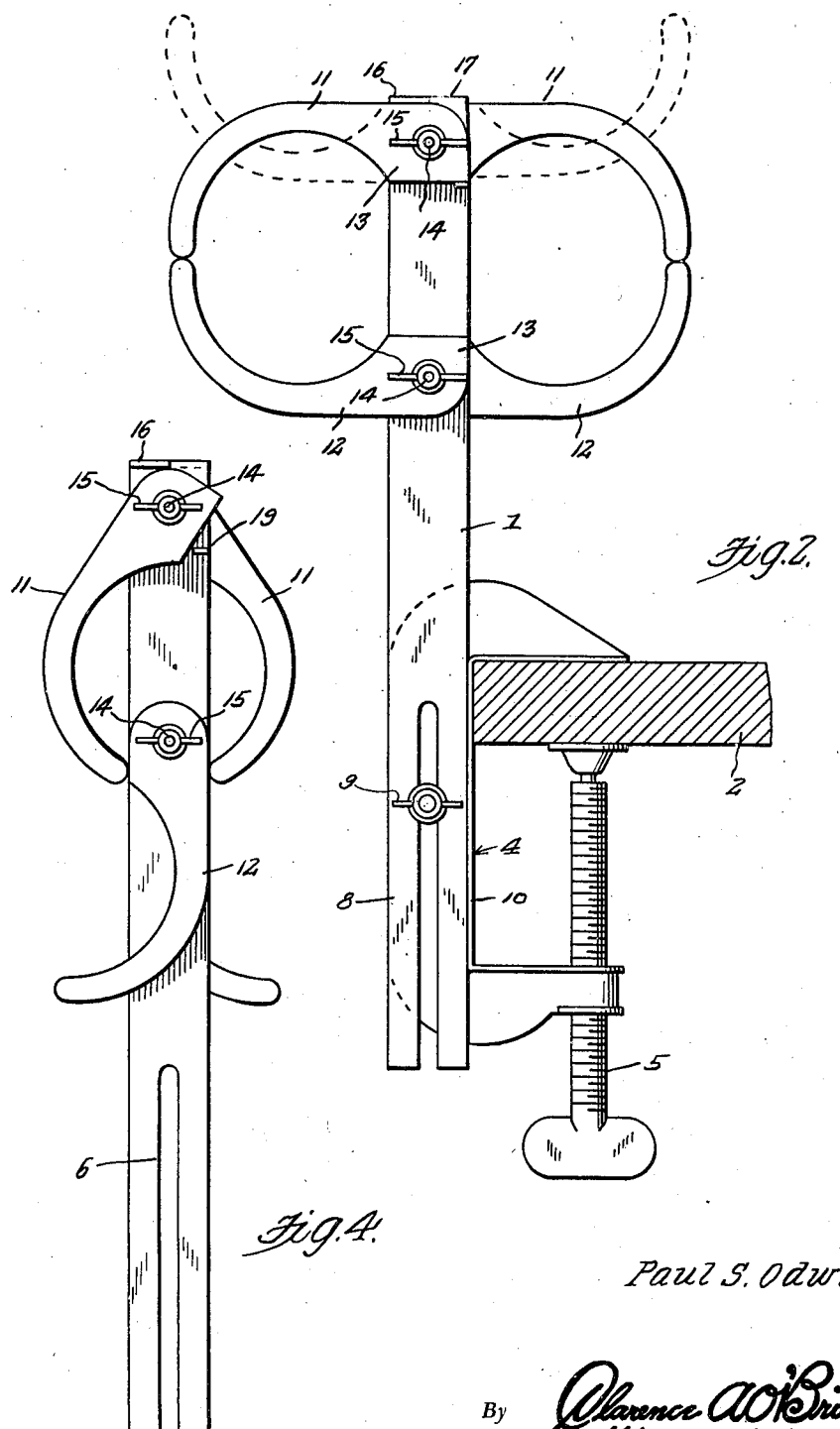
Inventor
Paul S. Odward.
By Clarence A. O'Brien
and Harvey B. Jacobson
Attorneys Patented Nov. 20, 1945

2,389,384

UNITED STATES PATENT OFFICE 2,389,384

HOLDER FOR FISHING POLES

Paul S. Odward, Lake Geneva, Wis.

Application June 21, 1944, Serial No. 541,317

3 Claims. (Cl. 248—42)

My invention relates to improvements in holders for fishing poles, the primary object in view being to provide an inexpensive, simply constructed device for attachment to a seat of a rowboat, or the like, to hold fishing poles resting on a side of the boat at selected angles, and which is foldable when not in use for carrying in a small space and adjustable quickly and easily to arrange the poles at selected angles.

Further and subordinate objects are also comprehended by my invention, all of which, together with the precise nature of my improvements, will be readily understood when the succeeding description and claims are read with reference to the drawings accompanying and forming part of this specification.

In said drawings:

Figure 1 is a view partly in edge elevation and partly in transverse section illustrating my invention in its preferred embodiment, applied to the seat of a boat, Figure 2 is a view in vertical section taken on the line 2—2 of Figure 1, Figure 3 is a view in top plan, Figure 4 is a view in side elevation of the shank and pole-holding arms, with said arms folded, Figure 5 is a fragmentary view in perspective of the upper end of the shank.

Referring to the drawings by numerals, in the illustrated embodiment thereof, my improved holder comprises a flat bar-like shank 1 adapted to be attached, at what constitutes its lower end, in upright position to one edge of a seat 2 of a rowboat, or the like, adjacent one side 3 of the boat.

For attaching the shank 1, the lower end thereof is equipped with the usual type of C clamp 4 for clamping to said edge of the seat 2 in upright position by means of the usual hand screw 5. The lower end of the shank 1 is longitudinally slotted, as at 6, to accommodate a bolt 7 extended transversely through the body 8 of the clamp 4 and equipped with a wing nut 9, whereby said shank 1 is adjustable vertically into different set positions with one edge engaging the usual marginal flange 10 on the body 8 of the clamp 4 so that said shank is prevented from tilting about the bolts 7.

Upper and lower, vertically spaced pairs of pole-holding arms are pivoted, as presently described, on the upper end portion of the shank 1, the arms of the upper pair being designated 11, and those of the lower pair 12. The arms 11, 12 of each pair are substantially semi-circular and hook-shaped, with enlarged butt ends 13. The butt ends 13 of each pair of arms 11, 12 are pivoted on a common pivot bolt 14 extended loosely through the shank 1, the butt ends of each pair of said arms being disposed upon opposite sides of the shank 1, whereby said arms are swingable on the bolts 15 vertically. Wing nuts 15 on the bolts 14 provide for clamping the butt ends 13 to opposite sides of the shank 1 to lock the arms 11, 12 in different positions.

As shown in Figures 1 and 2, the pairs of arms 11, 12 may be swung to extend oppositely, in each pair, from the shank 1 and with the arms in each pair curving toward the arms of the other pair to form together with the longitudinal edges of the shank 1 a pair of horizontally aligned, closed, ring-like collars adapted to receive the ends of fishing poles, one of which is shown in dotted lines in Figure 1 at A. A pair of oppositely extending, lateral lugs 16, 17 on the upper terminal of the shank 1 limit upward swinging of the pair of upper arms 11 in the described position of said arms 11 and 12.

Referring now to the use and operation of the described support, when the arms 11, 12 are swung into collar-forming positions, with the shank 1 adjusted vertically to the proper height, the ends of fishing poles, having their intermediate portions resting upon the side 3 of the boat, may be inserted through said collars so that the poles are held at any desired angle over the side of the boat, and the occupant of the boat may row the same, as for instance, in trolling, or in proceeding to different fishing locations, or fish with another line or engage in other activities.

As shown in Figure 4, the arms 11, 12 may be swung alongside the shank 1 in out-of-the-way positions so that the shank 1 and arms 11, 12 may be packed in a small space.

In another use of the invention, the pairs of arms 11, 12 may be swung to extend from opposite side edges of the shank 1, in each pair, in upturned position so as to form open rests in which the ends of fishing poles may be disposed. To swing the upper pair of arms 11 into upturned position, it is merely necessary to loosen the appropriate wing nut 15 and reverse the position of the upper pair relative to the collar-forming position of the pair, and then tighten said nut 15. A pair of oppositely extending lugs 18, 19 are provided on the shank 1 to support the upper pair of arms 11 when the latter are swung into the described upturned positions.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. A holder for fishing poles and attachment to a boat seat comprising a bar-like shank, means at one end of said shank adapted for attaching the same to said seat in upright position, and superposed pairs of hook-shaped arms pivoted on said shank and swingable thereon into laterally extending oppositely turned positions to form pairs of collars at opposite sides of the shank for holding fishing poles therein.

2. A holder for fishing poles and attachment to a boat seat comprising a bar-like shank, means at one end of said shank adapted for attaching the same to said seat in upright position, and superposed pairs of hook-shaped arms pivoted on said shank and swingable thereon into laterally extending oppositely turned positions to form pairs of collars at opposite sides of the shank for holding fishing poles therein, said arms being swingable into folded pendent positions alongside said shank when not in use.

3. A holder for fishing poles and attachment to a boat seat comprising a bar-like shank, means at one end of said shank adapted for attaching the same to said seat in upright position, and superposed pairs of hook-shaped arms pivoted on said shank and swingable into laterally extending oppositely turned positions to form pairs of collars for holding fishing poles therein, said arms being swingable into upturned positions at opposite sides of the shank to form upper and lower pairs of concave open rests for fishing poles.

PAUL S. ODWARD.